(12) United States Patent
Shoemaker

(10) Patent No.: US 7,696,637 B2
(45) Date of Patent: Apr. 13, 2010

(54) INPUT CIRCUIT TO REJECT WATER IN SWITCHES

(75) Inventor: Jim Milton Shoemaker, Horicon, WI (US)

(73) Assignee: Deere & Company, Moline, IL (US)

( * ) Notice: Subject to any disclaimer, the term of this patent is extended or adjusted under 35 U.S.C. 154(b) by 337 days.

(21) Appl. No.: 11/177,584

(22) Filed: Jul. 8, 2005

(65) Prior Publication Data

US 2007/0007819 A1    Jan. 11, 2007

(51) Int. Cl.
*B60L 1/00* (2006.01)
*B60L 3/00* (2006.01)
*H02G 3/00* (2006.01)

(52) U.S. Cl. ........................................ 307/9.1

(58) Field of Classification Search ............... 307/9.1; 180/273, 276, 286; 56/10.2 R
See application file for complete search history.

(56) References Cited

U.S. PATENT DOCUMENTS

| 5,155,376 | A  | * | 10/1992 | Okano ...................... 307/10.1 |
| 6,186,260 | B1 | * | 2/2001  | Schenck et al. ............. 180/273 |
| 6,609,357 | B1 | * | 8/2003  | Davis et al. ............. 56/10.2 A |
| 6,692,051 | B1 | * | 2/2004  | Kahn et al. ............... 296/24.39 |

* cited by examiner

*Primary Examiner*—Jared J Fureman
*Assistant Examiner*—Carlos Amaya

(57) ABSTRACT

An input circuit for a tractor includes one or more switches having open and closed positions, based on operating characteristics of the tractor, and a power transistor drawing a threshold current through the switches during short intervals during which the switch states are sensed by a microcontroller.

17 Claims, 1 Drawing Sheet

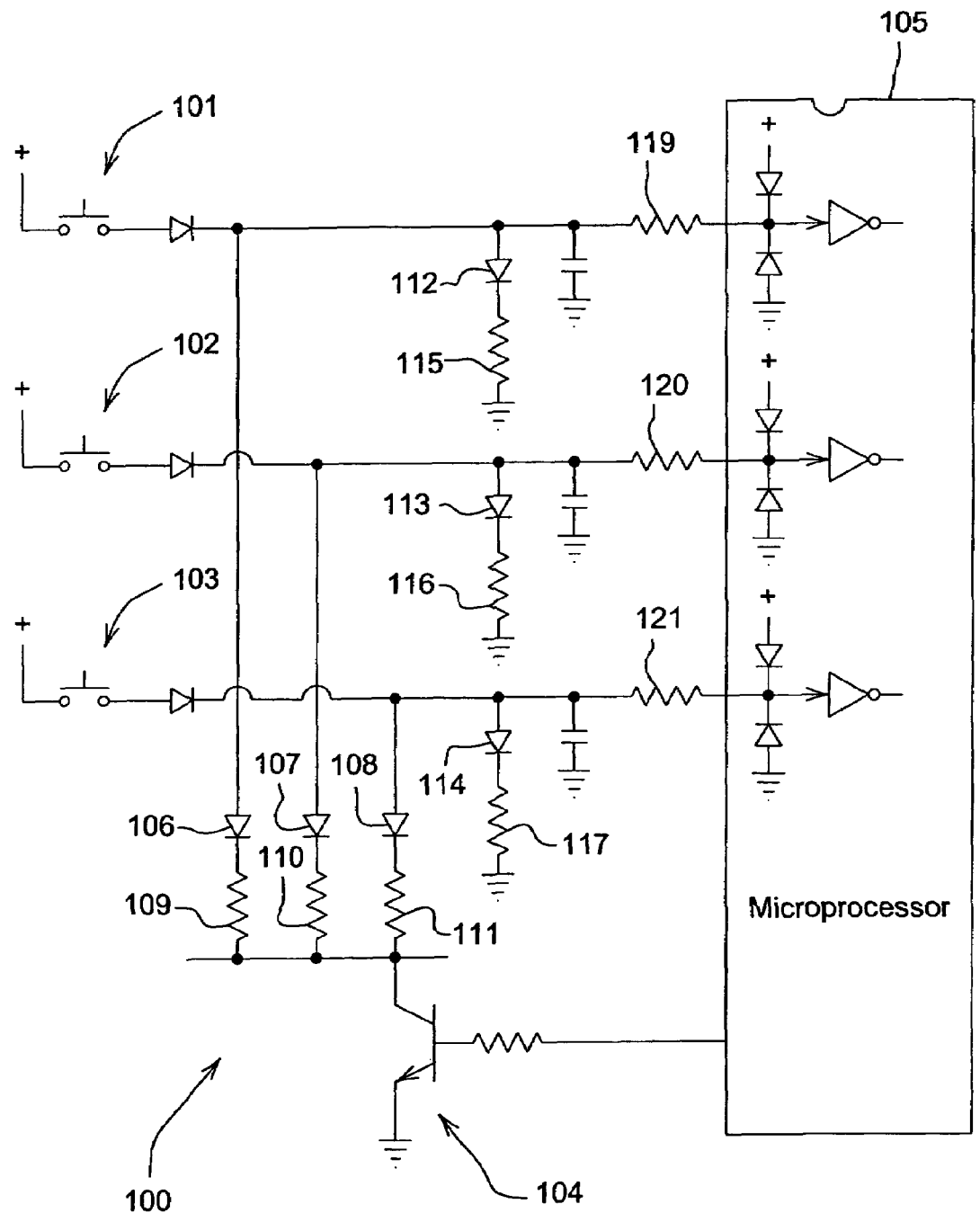

INPUT CIRCUIT TO REJECT WATER IN SWITCHES

FIELD OF THE INVENTION

This invention relates generally to electrical circuits on tractors, grass mowing machines, and utility vehicles, and more specifically to safety circuits that are used to stop or interrupt power for specified vehicle functions under certain conditions, and controller board inputs that read switches used in those circuits.

BACKGROUND OF THE INVENTION

Tractors, grass mowing machines, and utility vehicles may have electrical circuits that stop or interrupt power if an input switch is opened and certain conditions are met. These circuits may be used for safety purposes. For example, one such circuit may stop rotation of cutting blades in the absence of a seated operator.

These circuits typically use low cost, unsealed switches. As a result, water may enter the switch body during vehicle operation. Water entering the switch body may contain fertilizer, organic material, or other dirty contaminants. Empirical tests of switches having water in the switch bodies shows they typically exhibit less than 1000 ohms of resistance, depending on the impurities in the water.

In the past, these circuits have powered relays drawing about 100 mA. The relays have a pull in voltage of about 6 volts, and a drop out voltage of about 1 volt. This provides the relay good hysteresis for input state monitoring. For example, it takes 6 volts at 100 mA to turn on a seat interlock relay. Water in the seat input switch may not provide a false indication (i.e., the switch will not appear closed) unless the resistance drops below about 60 ohms.

More recently, microcontrollers are used instead of relays in these circuits. Several problems may be encountered, as described below.

First, water in the input switch may appear to a microcontroller as a valid switch closure input. This is because a microcontroller in such a circuit may have high impedance inputs, typically about 10K ohms or higher. A 150 ohm resistor placed across each input switch (in order to draw approximately 100 mA at 14.5 volts) must have a continuous rating of 1.5 Watts. However, it is preferable to use resistors rated at about 0.125 Watts.

Second, multiple inputs may continuously dissipate heat into the electronics enclosure, which can be detrimental. For example, mowing machines with multiple inputs that may dissipate high wattage (i.e., 20 Watts or more) inside the control enclosure. Due to the heat, component life may be shortened significantly.

Third, if battery voltage is low, a circuit with a microcontroller may sense the input switch as open when the switch is closed. For example, if battery voltage drops to about 5 volts during cold cranking of an engine, a relay may stay energized due to its 1 volt drop out. However, a microcontroller with an input that is voltage based to a 6 volt threshold may stop cranking the engine because it incorrectly senses the input switch is open. Setting the voltage threshold lower can alleviate this problem, but makes the input more sensitive to water in the switch.

Attempts have been made to address the problems described above. For example, an analog to digital converter on each input may be used to evaluate the voltage being returned from the input switch. This is not a preferred solution because it requires costly analog circuits and wiring. Alternatively, some tractors address the problem through use of a positive temperature coefficient thermistor on each input switch to draw higher currents when the switch is first closed, then reduce the current. This also is not an optimal solution, because positive temperature coefficient thermistors are expensive and do not address the problem of an input switch that is properly closed, then opened with water inside it to falsely maintain the circuit. Additionally, the ptc current may be used more as a "cleaning pulse" to remove oxides or corrosion from switch contacts going into high impedance inputs on the controller.

An improved input circuit is needed for tractors, mowing equipment and utility vehicles that will reject water in an open input switch. A low cost input circuit is needed that will improve the operation of circuits used to ensure safe vehicle operation.

SUMMARY OF THE INVENTION

The present invention provides an improved circuit for tractors, mowing equipment and utility vehicles that will reject water in an open input switch. The input circuit is low cost and helps ensure safe vehicle operation.

The circuit includes one or more switches sensing various operating conditions of the tractor or vehicle, and a microcontroller sensing the state of the switch or switches and performing one or more functions based at least in part on the switch state. A power transistor may be connected through a diode and resistor to the switch or switches, the power transistor normally being in an off condition, and being powered during short intervals to an on condition to increase current to a threshold through the switch.

BRIEF DESCRIPTION OF THE DRAWINGS

FIG. 1 is a schematic of an interlock circuit according to a first embodiment of the invention, that rejects water as an input.

DESCRIPTION OF THE PREFERRED EMBODIMENT

In one embodiment of the invention shown in FIG. 1, circuit 100 may be included in a tractor, grass mowing machine or off-road utility vehicle. The circuit includes input switches 101, 102, 103. The state of each switch may depend on one or more operating conditions of the vehicle. Each switch may have two positions; i.e., an open position and a closed position. For example, an input switch may be an operator presence switch that is closed only if an operator is seated, a parking brake switch that is closed if the parking brake is locked, or another switch sensing one or more other vehicle conditions relating to safety or performance. The input switch may be a low-cost, open body switch that may be subject to adverse operating conditions.

In one embodiment, each switch 101, 102, 103 may draw a small amount of nominal current most of the time, and a substantially higher threshold current for short intervals. For example, each switch may draw about 10 to 20 milliamps most of the time, while the threshold current may be about 100 to 200 milliamps for short intervals. The short intervals may be about one millisecond every fifty milliseconds, and may be controlled by microprocessor 105.

In one embodiment, the higher current draw may be accomplished by turning on the power transistor 104 for short intervals. The power transistor may be normally off and may be connected to switches 101, 102, 103 through diodes 106, 107, 108 and 47 ohm resistors 109, 110, 111. The input switches may be read for the short interval of less than about one millisecond, and then power transistor 104 may be turned off.

In one embodiment, when power transistor 104 is on, the state of each input switch may be transferred through resistors 119, 120, 121 to an input mask in microcontroller 105. The microcontroller also may receive input regarding one or more other operating conditions of the vehicle. The microcontroller may be programmed to provide a signal or signals to activate or deactivate one or more functions of the vehicle, such as stopping rotation of cutting blades or turning off a power take off, if the switch state along with other information satisfies certain specified conditions.

In one embodiment, the normally off power transistor may be a bipolar junction transistor (BJT) or field effect transistor (FET) connected through a resistor and diode to each input switch. Alternatively, several power transistors may be used, with one power transistor connected to each input switch.

In one embodiment, each input switch 101, 102, 103 may be connected to a visible indicator such as a light emitting diode (LED) 112, 113, 114 and resistor 115, 116, 117 to indicate if the switch is in the open or closed state. When power transistor 104 is off, only LED current (about 10 to 20 milliamps) may flow through each of the switches. When the power transistor is on, significantly higher current (about 100 to 200 milliamps) may flow through each of the switches.

Circuit 100 is low cost and has low power dissipation. The average power draw of circuit 100 may be quite low. The circuit includes a microprocessor or microcontroller that controls the timing of the current draw through each switch in a duty cycle. The circuit inputs reject water as an input in an open body switch.

The invention claimed is:

1. An apparatus comprising:
a switch sensing an operating condition of a tractor and having a first state if the operating condition is not satisfied and a second state if the operating condition is satisfied;
a microcontroller to deactivate at least one function of the tractor if the switch is in the first state; the switch drawing a nominal current except during specified time intervals that are shorter than the time for drawing the nominal current; and
a power transistor connected through a diode and resistor to the switch, the power transistor normally being in an off condition, and being powered during the specified time intervals to an on condition to increase current above the nominal current to a threshold through the switch; the microcontroller reading if the switch is in the first state or the second state only during the specified time intervals.

2. The apparatus of claim 1 further comprising a microprocessor controlling the time intervals when the power transistor is powered to draw a threshold current through the switch.

3. The apparatus of claim 1 wherein the switch is an operator presence switch.

4. The apparatus of claim 1 wherein the switch is a parking brake switch.

5. The apparatus of claim 1 wherein the switch senses a condition relating to vehicle operating safety.

6. A circuit for a tractor comprising:
a plurality of switches, each switch having an open state and a closed state; the open and closed states based on operating characteristics of the tractor; each switch drawing a nominal current except during certain time intervals that are shorter than the time for drawing the nominal current;
a power transistor drawing a threshold current higher than the nominal current through the switches during the time intervals; and
a microprocessor controlling the time interval length, reading the state of each switch only during the time intervals, and providing signals to deactivate at least one function of the tractor if at least one of the switches is in an open state during the time intervals.

7. The circuit of claim 6 wherein each of the operating characteristics are safety parameters of the tractor.

8. The circuit of claim 6 wherein the interval length is about 1 millisecond.

9. The circuit of claim 6 further comprising a plurality of power transistors, with each power transistor connected to one of the switches.

10. The circuit of claim 6 further comprising a diode and a resistor between each switch and the power transistor.

11. An apparatus comprising:
a circuit having a plurality of open body switches connected to at least one normally off power transistor; the switches movable between open and closed states based on operating characteristics of an off-road vehicle; the switches drawing a nominal current except during prescribed time intervals that are shorter than the time for drawing the nominal current; and
a microprocessor operably connected to the power transistor and to the switches; the microprocessor turning the power transistor on at prescribed time intervals to provide a current to the switches higher than the nominal current and sensing the switch state only during those time intervals; and disabling a function of the off-road vehicle if at least one switch is detected in the open state during those time intervals.

12. The apparatus of claim 11 further comprising a resistor and a diode between each switch and the power transistor.

13. The apparatus of claim 11 wherein at least one of the switches has a closed state if an operator is sensed on the vehicle.

14. The apparatus of claim 11 wherein at least one of the switches has a closed state if a parking brake is locked.

15. The apparatus of claim 11 wherein each switch draws between about 10 milliamps and about 20 milliamps when the power transistor is normally off, and draws between about 100 milliamps and about 200 milliamps when the power transistor is on.

16. The apparatus of claim 11 further comprising a visible indicator showing if a switch is in the closed state while the switch draws the nominal current or the threshold current.

17. The apparatus of claim 11 wherein the time intervals are about 1 millisecond every 50 milliseconds.

* * * * *